Nov. 19, 1940.  H. T. AVERY  2,222,164
CALCULATING MACHINE
Original Filed Jan. 23, 1933  7 Sheets-Sheet 1

FIG. 1.

INVENTOR.
Harold T. Avery.
BY
ATTORNEY.

Nov. 19, 1940.   H. T. AVERY   2,222,164
CALCULATING MACHINE
Original Filed Jan. 23, 1933   7 Sheets-Sheet 2

INVENTOR.
Harold T. Avery.
BY *[signature]*
ATTORNEY.

Nov. 19, 1940.   H. T. AVERY   2,222,164
CALCULATING MACHINE
Original Filed Jan. 23, 1933   7 Sheets-Sheet 3

FIG_5_

FIG_6_

INVENTOR.
Harold T. Avery.
BY
ATTORNEY.

INVENTOR.
Harold T. Avery.
BY
ATTORNEY.

Nov. 19, 1940.                H. T. AVERY                2,222,164
                         CALCULATING MACHINE
              Original Filed Jan. 23, 1933    7 Sheets—Sheet 7

INVENTOR
Harold T. Avery
BY
ATTORNEY

Patented Nov. 19, 1940

2,222,164

UNITED STATES PATENT OFFICE 2,222,164

CALCULATING MACHINE

Harold T. Avery, Oakland, Calif., assignor to Marchant Calculating Machine Company, a corporation of California Original application January 23, 1933, Serial No. 653,207. Divided and this application August 17, 1937, Serial No. 159,523

10 Claims. (Cl. 235—79)

The present invention relates to calculating machines and has as its general object the provision of improvements in a high speed, quietly operating machine of the rotary type such as that disclosed in the co-pending applications of Avery entitled "Calculating machines," Serial No. 653,207 filed January 23, 1933, of which this application is a continuation-in-part and Serial No. 702,949 filed December 18, 1933, of which this application is a division.

While the rotary type machine has always had certain obvious advantages over other types, most rotary machines commercially produced have operated their registering mechanisms intermittently, giving rise to overthrowing thereof at high speeds, and in attempting to prevent such errors, noisy spring pressed pawling mechanisms have been incorporated.

The present machine overcomes such disadvantages by retaining the registering mechanism constantly in mesh with its actuators throughout the period of operation of such actuators. Since both the actuators and the registering mechanism are arrested before such engagement is broken, no auxiliary overthrow preventing devices are necessary and the noise incident to the operation of such devices is avoided. At the same time, the speed of such a machine can be much higher than that of a machine depending for accuracy upon the proper functioning of such auxiliary devices.

It is an object of the invention to provide an improved form of duplexing accumulator adapted for continuous multicyclic operation in either direction.

It is an object of the invention to facilitate the assembly and timing of the planetary assemblies used in such accumulators.

It is an object of the invention to provide an improved mechanism for resetting to zero, registering mechanism of the type disclosed.

Other objects will appear during the following detailed description of a preferred form of the invention, reference being had to the accompanying drawings forming a part of this specification, in which.

The machine of the present invention is of the key set type in which means are provided for first setting one factor of a calculation upon a keyboard or equivalent mechanism, and subsequently operating the machine in a manner indicated by the character and amount of another factor of the calculation.

Figure 1:
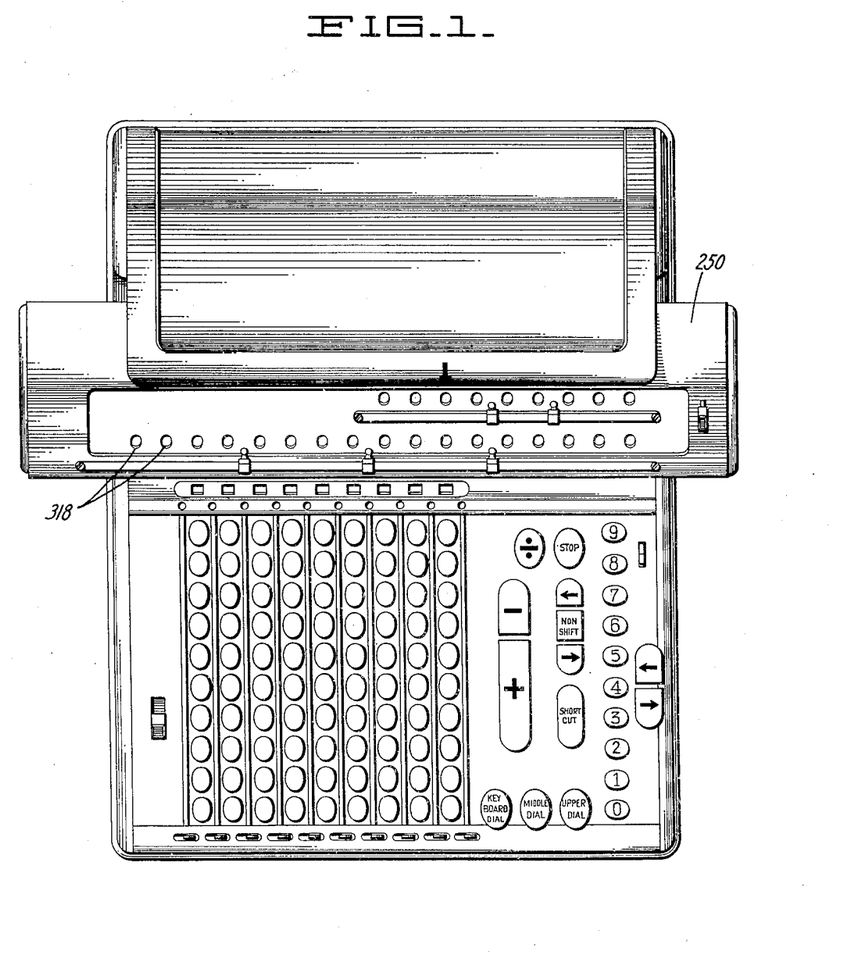
Figure 1 is a plan view of the machine of the present invention, showing the keyboard, carriage, and the several controls.

In a machine designed for calculation in the decimal system, the keys are preferably arranged, as shown in Figure 1, in a series of banks of ten keys each, the number of banks provided in each machine depending upon the magnitude of the factors with which the machine is designed to deal.

Upon manipulation of the operating controls, the number set up on this keyboard is added to or subtracted from the number registered by the accumulating mechanism mounted in the shiftable carriage, as described in the above identified applications.

However, in order to perform any mathematical computation such as addition, subtraction, multiplication, or division, mechanism must be provided for advancing each of the numeral wheels of this accumulating mechanism one extra increment whenever the next lower numeral wheel has made a complete rotation. This process is known as "carrying the tens," in a machine operating according to the decimal system.

Figure 2:
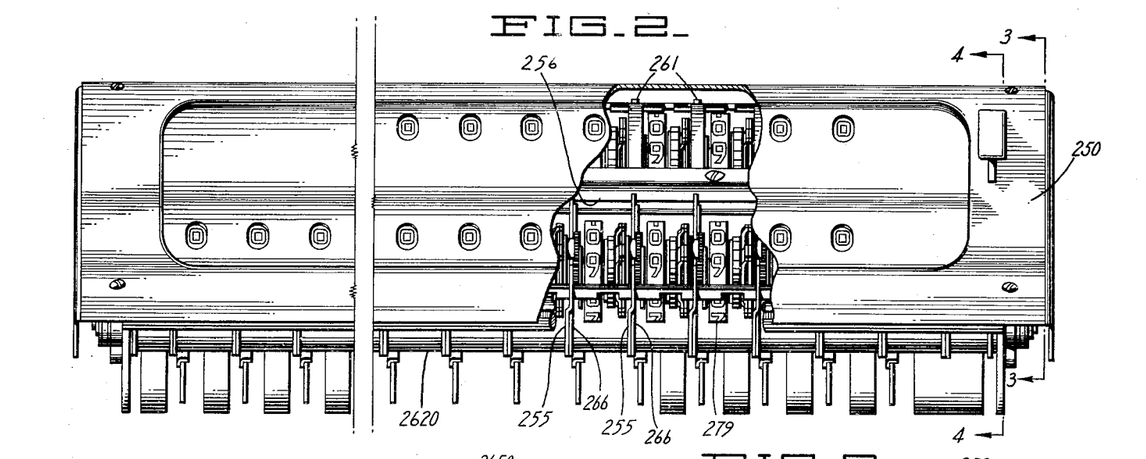
Figure 2 is a front elevation of the carriage, a portion of the cover plate being broken away to show the accumulator and counter mechanisms therein.
Figure 3:
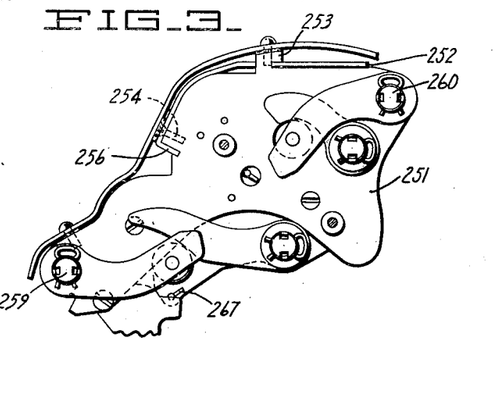
Figure 3 is a section along the line 3—3 in Figure 2.
Figure 4:
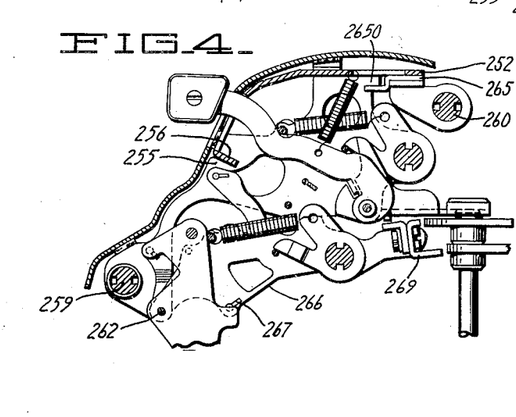
Figure 4 is a section along the line 4—4 in Figure 2.
Figure 5:
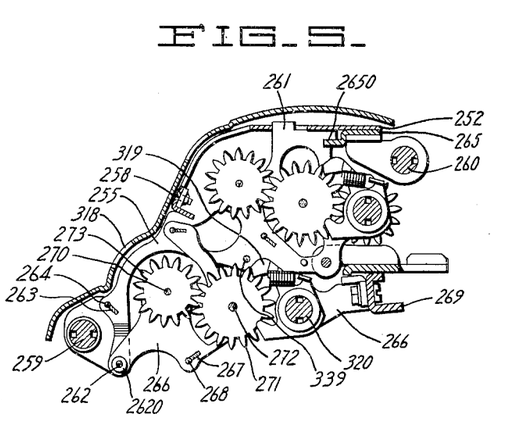
Figures 5, 6, 7 and 8 are sections taken through the carriage to illustrate the construction of the accumulator and counter mechanisms, the sections being taken so as to bring out the intersection and relationship between certain of the parts.
Figure 6:
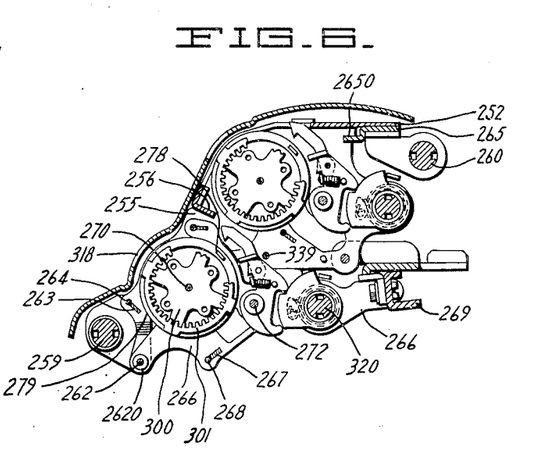

In the present machine this function is accomplished by accumulator mechanism mounted in a carriage 250 (Figures 1 to 8), the main frame of which comprises end plates 251 (Figure 3) connected by a top plate 252 having apertures to receive lugs 253 on end plates 251 and secured at its forward end by screws 254 which extend into the end plates. The forward end of plate 252 is notched to fit into notches in brace plates 255 and to provide extensions 256 fitting between adjacent brace plates 255 (Figures 2 and 4). Screws 258 secure ears on some of the brace plates to the top plate 252 (Figure 5). The front and rear carriage track shafts 259 and 260, the ends of which are journaled in the two plates 251, and the several other cross shafts to be hereafter described, serve as additional bracing means for this main frame structure.

Mounted at even intervals between the two end plates 251 are a series of carriage brace plates 255 (Figures 2, 4, 5, 6, 7 and 8) having lugs 261 projecting through spaced slots in the top plate 252 and supported at the front of the carriage by cross shaft 262 carrying spacing sleeves 2620. Locked spacing combs 263 extend through spaced slots in each brace plate and are locked in place by rods 264, while the top plate 252 spaces adjacent plates 255, as has been described. A retaining comb 265 screwed to the top plate 252 spaces the rear edges of the plates and, by underlying lugs 2650 formed on said plates, serves to hold lugs 261 in their notches in the top plate.

Supported in the end plates 251 and by the several brace plates 255, the cross rod 262 serves also as a pivotal support for a series of plates 266 (Figures 2, 4, 5, 6, 7 and 8), one of which is mounted on said rod 262 adjacent each of the carriage brace plates 255. These plates 266 are spaced and braced adjacent their forward ends by comb 267 interlocking with slots in each plate 266 and held in place by rod 268. The plates are connected at their rear end by a common bail 269 known as the "dipping bail," by means of which the entire group of plates 266 can be simultaneously oscillated about shaft 262 during operations hereinafter described, in which description the mechanism supported by said plates 266 is referred to as the "dipping carriage."

The units of the accumulator are assembled on a shaft 270 (Figures 5 to 13) supported by plates 266, there being one of said plates between each adjacent unit. Each unit is adapted to be driven by one of the selection gears 189 (Figure 13) with which intermediate gears 271, rotatably mounted on shaft 272 and entrained with the gears 273 (see also Figure 5) of the several accumulator units, may be meshed by lowering the dipping carriage, as hereinafter described. Suitable clearances are provided on the several plates 255 and 266 to permit the necessary connections between the orders of the accumulator for effecting tens transfer or carry operation.

Referring more particularly to Figures 9 to 12, it will be noted that each accumulator unit comprises a spider 274 which is rigidly secured to a sleeve 275 on shaft 270. This spider 274 carries an internal ring gear 276 on its right hand side, which is spot welded or riveted to the flared out portion 277 of each of the spider arms. A right angular extension 278 of one of said arms projects toward the right from said spider, slightly beyond the right side face of a thin shell 279 fixed to the spider 274 and the internal gear 276 thereon, and serves as a zero stop in resetting operations described hereafter. The periphery of said shell 279 is sufficiently wide to accommodate the digits ranging from "zero" to "nine" arranged as shown.

Figures 11, 12, 13:
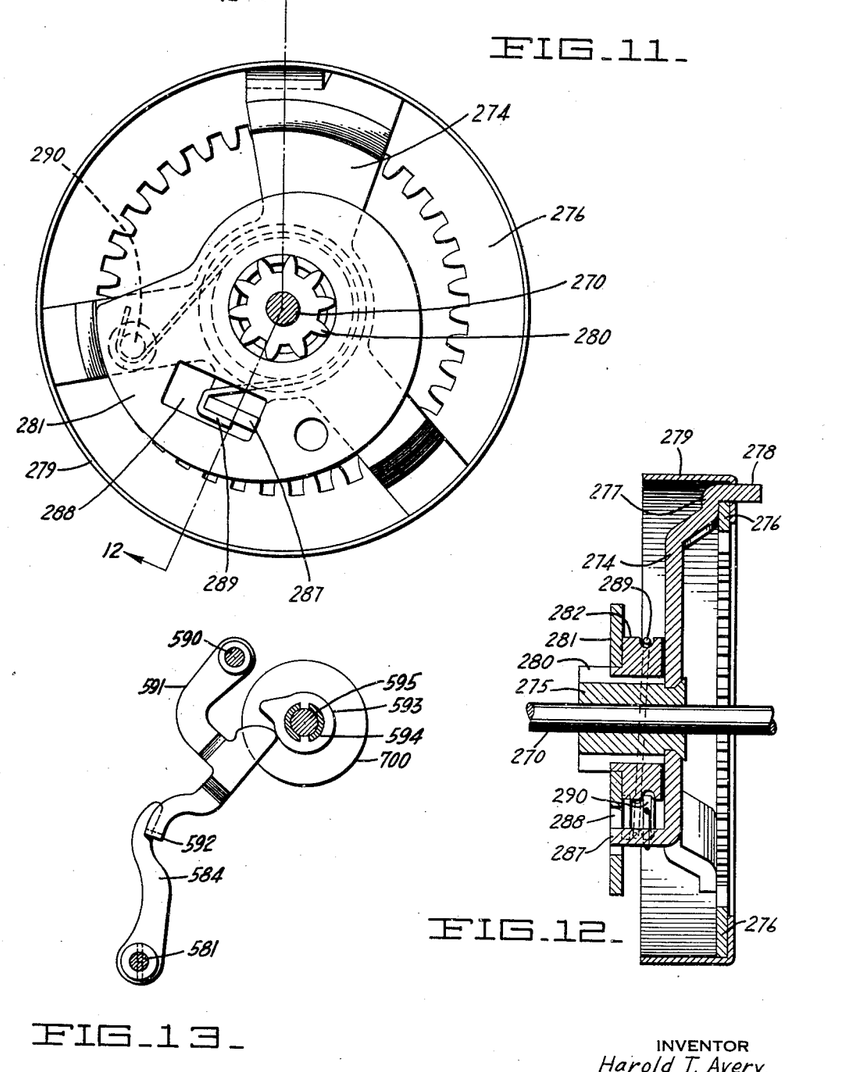
Figure 11 is a side elevation of a dial unit.
Figure 12 is a section taken along the line 12—12 of Figure 11.
Figure 13 illustrates details of the mechanism utilized to control release of the carriage from dipped position.

Integral with the sleeve 275 on shaft 270 is a sun gear 280 abutting a brace plate 266, and interposed between said sun gear 280 and the spider 274 is a snail cam 281 and spacer 282. A projection 287 from the spider 274 extends into an enlarged slot 288 in the cam 281 to permit limited movement of said cam with respect to the spider. A small wire spring 289 is extended around spacer 282 between the projection 287 and a stud 290 on the cam 281 so that the cam is urged into the position in which it is shown in Figure 11. This construction has the advantage that, under certain conditions to be pointed out hereinafter, spring 289 may be temporarily overcome and the cam 281 moved slightly without moving the rest of the functional unit just described.

Assembly in properly timed relationship is secured by welding the ring gear 276 to the spider 274 in a certain relationship established by the position of a notch in the ring gear 276 through which the lug 278 of the spider 274 passes. When the sun gear on its integral sleeve 275 is placed on the spider, the extension 287 then locates the snail cam with respect to the internal gear so that sun gear 280, snail cam 281, and ring gear 276, are fixed in a predetermined position relative to each other. Assembly by skilled mechanics is thus made unnecessary and possible errors are prevented, for the three units can be assembled in only a given relationship in which they are maintained by riveting the end of the sleeve 275 to the spider 274, as shown.

Located immediately to the right of mechanism just described is a plate 292 (Figures 9 and 10) fixed to a spur gear 273 which may be driven by a gear 189 (Figure 13) through an intermediate gear 271 when plates 266 are dipped. These elements are rotatably mounted on a sleeve 293 which in turn is rotatably mounted on a sleeve 294. Plate 292, which includes an apertured ear 295 for use in timing, as will presently appear, is, in turn, fixed to a plate 296 by stud 297 provided at each end of said plate, and on each of said studs is mounted a planet gear 298 meshing with the ring gear 276 carried by spider 274 and with another sun gear 299 formed integrally with sleeve 293. Thus, the spur gear 273, the plate 292, the planet gears 298, and the ring gear 276, constitute a planetary assembly which rotates about the sun gear 299 and comprises the means by which the numeral bearing shell 279 can be rotated by the actuating mechanism of the machine which drives the gear 271 (Figure 13) as hereinbefore described.

For tens-carrying, there is provided a spider 300 secured to the right end of the above mentioned sun gear sleeve 293, which spider carries an internal gear 301, the spider and gear being provided with four lugs 302 which serve as assembly guides and as stops, as hereinafter described. The spider also includes four apertured ears 303 for use in timing, as will appear.

Means are provided for driving the spider 274 and its associated dial shell 279 by means of the spider 274 of the next lower order independently of any movement of gear 273. This means includes the aforementioned internal gear 301 and another unit sub-assembly now to be described.

Sleeve 294 which, as previously described, supports the sleeve 293 on shaft 270, is provided with a double arm member 304, one arm 305 of which is apertured, while the other, 306 supports a stub shaft 307 to which are fixed planet gears 308 and 309. The planet gear 308 meshes with the internal gear 301 on spider 300 while the planet gear 309 meshes with the sun gear 280 of the adjacent lower order. Sleeve 294 includes an integral spacer 310 so that gear 308 is positioned in alignment with ring gear 301 and does not abut the spider 300, and the end of the sleeve is riveted over to secure member 304, thus providing a unit assembly.

The central portion of member 304 is equipped with a gear segment 311 meshing with teeth 312 (Figure 8) formed on a lever 313 pivoted to a shaft 272 which is mounted parallel to the shaft 270 in the plates 266. Lever 313 includes an extension 314 engaging a lever 315 also mounted on shaft 272 (Figure 7) which lever carries a roller 316 in the same plane as snail cam 281. Lever 313 (Figure 8) is urged clockwise by spring 317 so that the roller 316 (Figure 7) carried by lever 315 is urged thereby into contact with the adjacent snail cam 281. In the units order the sleeve 293 (Figure 10) may be secured directly to the plate 266 adjoining it at the right, inasmuch as there is no lower order from which tens must be carried.

This arrangement of the several accumulator units permits simultaneous digitation and tens-transfer operations known in the art as "duplexing."

In operation, the gear 273 is driven by the actuating mechanism and revolves planetary gears 298 about shaft 270 as a center. Where, as in the units order, the sleeve 293 with its sun gear 299 is fixed, this revolution of gears 298 will, since they are in mesh with sun gear 299, cause them to also rotate about studs 297 and thus drive ring gear 276 ahead in the direction in which gear 273 is being driven. Since ring gear 276 is fixed to the indicia bearing shell 279, this movement will bring a figure opposite the sight opening 318 in the carriage cover, indicative of the portion of a rotation given gear 273.

Whenever a given amount is thus entered in any one unit of the accumulator, member 304 being held in a fixed position, one tenth of that amount will be entered in the next higher unit by means of the carrying mechanism comprising sun gear 280 fixed to spider 274 and driving planetary gears 308 and 309. These, in turn, drive integral gear 301 fixed to sleeve 293 of the next higher unit in a direction opposite to that of spider 274, and, by rotating said sleeve, drive sun gear 299 integral therewith. If gear 273 and studs 297 are stationary, the movement of sun gear 299 rotates ring gear 276 in the direction opposite to that of gear 299 and therefore in the same direction as that of the lower order dial transmitting the carry. If gear 273 is moving to introduce digitation, as previously described, ring gear 276 will move by an amount equal to the resultant of that produced by the rotation of both gear 299 and gear 273, the movement of the ring gear, of course, being the resultant of the movement of the sun gear and the displacement of planetary centers. Thus the movement of any higher order dial becomes the resultant of the digitation entry into its own order and the carry movement from the next lower order.

The gear ratios are in usual practice, of course, such that the carry movement received by the higher order dial is one-tenth of that of the lower order dial. A typical arrangement to produce this result is as follows: sun gear 280— ten teeth; planetary gears 308 and 309—fifteen teeth; ring gears 274 and 301—forty teeth; sun gear 299—sixteen teeth; and planetary gears 298—twelve teeth. With this arrangement, one full clockwise turn of a lower order dial rotates sun gear 280 ten teeth, advancing ring gear 301 next to the left, ten teeth or one-quarter turn clockwise. This advances sun gear 299 integral therewith, one-quarter turn, or four teeth counterclockwise, which in turn advances ring gear 276 on the higher order assembly four teeth, or one-tenth turn clockwise. This carry movement will in turn impart one-hundredth of a turn to the dial next higher than that receiving the original carry movement, one-thousandth of a turn to the dial next higher than that, and so on, and is known in the art as a "crawl" carry movement.

With this gear arrangement, sun gear 299 having four-tenths as many teeth as ring gear 276, one full turn of digitation gear 273 will produce one and four-tenths turns of ring gear 276. Therefore, if gear 273 is made a fourteen-tooth gear, each tooth advance of the gear will produce one-tenth of a turn of ring gear 276, or one figure advance of the dial.

In order that this tens-carrying movement may be properly transmitted to all units of the accumulator, it is desirable that digitation gears 273 move only in accordance with values being introduced into the accumulator. To this end means are provided to prevent movement of the gears 273 except as values are being introduced. This means comprises spring pressed pawls 319 (Figure 8), freely mounted on shaft 320, each of which is adapted to engage the associated intermediate gear 271 in each order. As described above, these gears 271 mesh directly with the gears 189 (Figure 13) of each accumulator unit and each pawl 319 therefore acts as a retaining means for one of said gears, being released during actuation, as will presently appear.

Thus, from the foregoing description, it is apparent that rotation of a numeral wheel in any order will cause all the numeral wheels in the higher order or to the left thereof, to also rotate a certain amount successively either in additive or subtractive direction, depending upon the direction of rotation of gears 273, while in all the orders of a lower value or to the right of the last order in which digitation takes place, no such fractional values are entered.

By virtue of this continuous gearing between the various orders, the dials are advanced so that the numerals are not properly lined up at the sight openings 318, and, in order to overcome this condition and render a readable indication of the result, mechanisms have been provided which will turn every numeral wheel to proper alignment with said sight openings directly after an actuation.

The mechanism for effecting this lineup of the dials comprises the snail cam 281 at the left of each spider 274, and which cooperates with and serves to position the indirectly spring tensioned lever 315 (Figure 7) pivoted at 272. In this figure the snail cam 281 and lever 315 are shown in a position in which the roller 316 on said lever contacts with the high point of said snail cam, which high point represents the zero position of its associated dial wheel 279. The contour of the snail cams 281 is proportioned in such a manner that each higher digit up to nine on the dials is represented by a successive decrease in its radius until the lowest point on said cams underlies the rollers when the digit 9 on said numeral wheels is opposite the sight openings 318; the values increasing on the dials as well as on the cams in clockwise direction, so that for addition the dials and cams are rotated in counter-clockwise direction and for subtraction in clockwise direction, when viewing the machine from the right hand side.

As the carriage is moved down into this lowered position, a notch in extension 340 on lever 313 (Figure 8) engages shaft 339 which is supported in plates 255. This rocks lever 313 counter-clockwise and results in member 304 moving clockwise to advance gears 309 and 308. This results in the carry from the right, received by gear 309 from gear 280 with which it is meshed and which is in the next order to the left, being entered into the next higher order. When the dipping carriage is in its lowered position, lever 315 (Figure 7) is freed by lug 314 and permitted to fall to a position in which roller 316 is just clear of snail cam 281. Under these conditions, sleeve 294 and member 304 (Figure 10) are held in fixed positions, and each dial is in general advanced to a partial position depending on the digitation it has received and the carry from all orders to the right. For instance, if the resultant value entered is 2,375, the first dial stands between a 2 and a 3 registration, being 0.375 of the way from the 2 to the 3 registration. The next dial stands 0.75 of the way from 3 to a 4 registration, the next 0.5 of the way from a 7 to an 8 registration, and the next dial squarely at a 5 registration.

Figure 7:
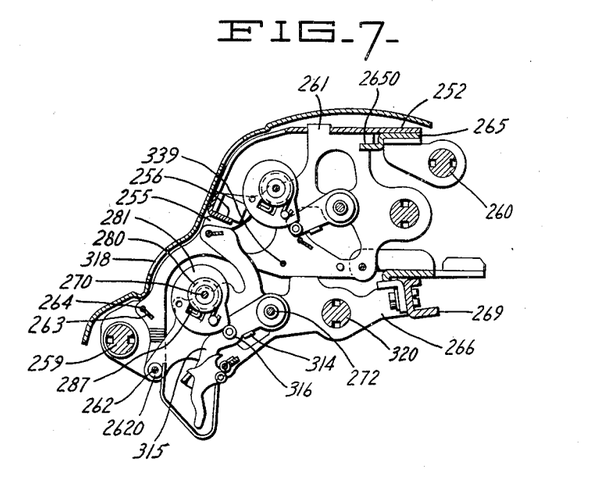
Figure 8:
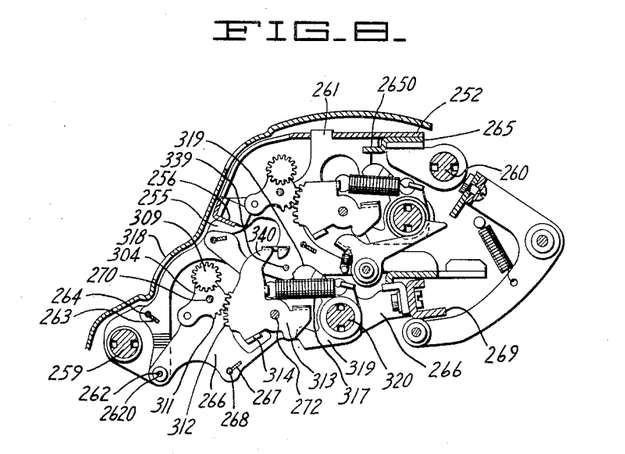

The relation of the steep face of cam 281 to the pivot point 272 of lever 315 (Figure 7) is such that when the numeral wheels move from 9 to 0, as the carriage is dipped while nines are registered, the steep cam faces move against rollers 316 somewhat before levers 315 have arrived at the position shown in Figure 7. The downward movement of lugs 314 and the counter-clockwise movement of cams 281 take place concurrently, and the cam faces cannot be made less steep and still be capable of supporting rollers 316 properly when the parts are positioned as shown in Figure 7.

Figure 9:
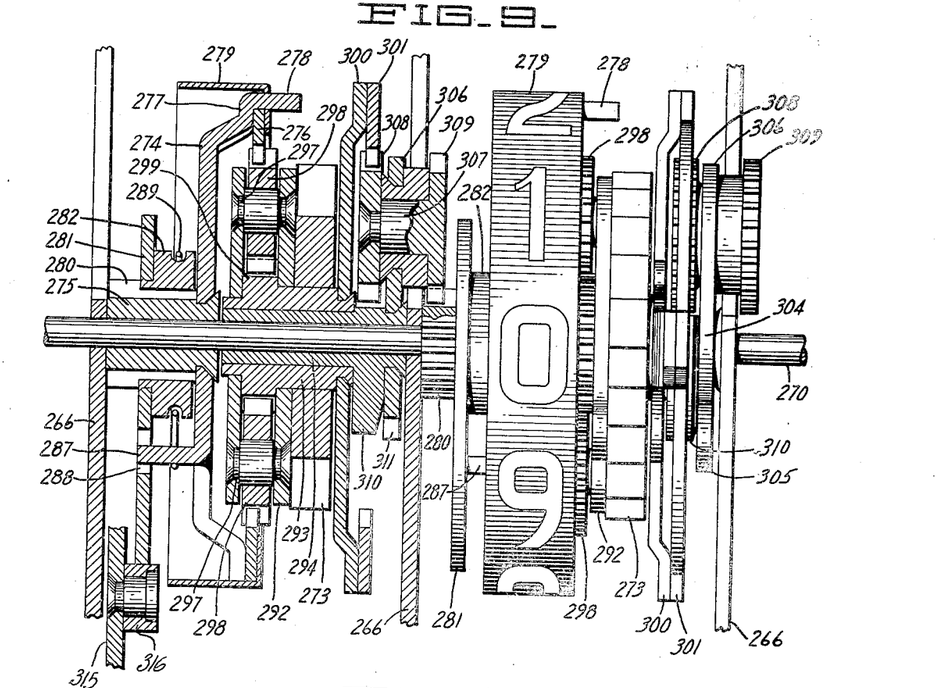
Figure 9 is an enlarged front elevation, partly in section, of two connected dial assemblies, illustrating the manner of construction thereof.
Figure 10:
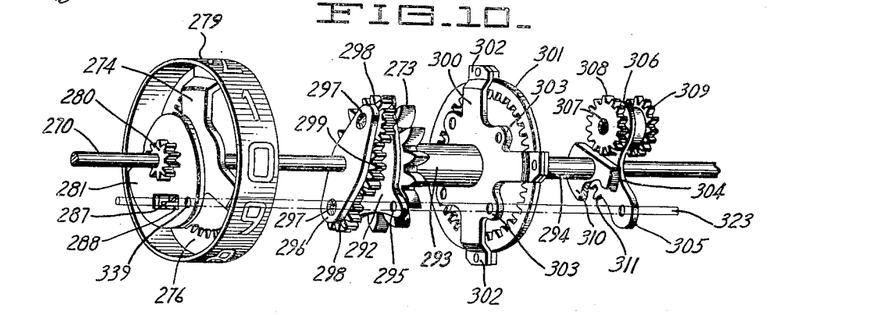
Figure 10 is an exploded perspective view of a dial assembly.

It is therefore clearly necessary that this conflict be compensated in some way, and such is the function of the special mounting of cam 281 shown in Figures 9, 11 and 12, which has been heretofore described in detail. In a mechanism embodying this structure, resistance to the movement of cams 281 tensions the springs 289 until rollers 316 have been permitted to move to their lowermost positions, whereupon the said springs return the cams to normal position.

If cams 281 were rigidly fixed to spiders 274, resistance to movement thereof would tend to cause rotation of gears 273 against the tension of the springs acting through holding pawls 319 and intermediate gears 271. While such movement is ordinarily less than half a tooth, it is clear that any excess thereover would cause inaccuracy in the computation.

When the calculating is completed and the dipping carriage raised, it is desired to back up each dial by the fractional amount, it stands ahead of an even registration, to secure alignment of the numerals in the sight openings. To this end, each lever 315 (Figure 7) is allowed to rock clockwise under the tension of spring 317 (Figure 8) until roller 316 rests against snail cam 281 which, due to the cam shape already described, allows lever 315 to rock clockwise by an amount proportional to the registration on the dial by which the cam is positioned. This limited rocking of each lever 315 limits the movement of stud 307 to an amount proportional to the registration on the dial to the right of it. Ring gear 301 is thus advanced by spring 317 a corresponding amount and the next dial to the left is backed up an amount proportional to the registration of the next lower dial. This is, necessarily, the amount by which the higher dial stood ahead of an aligned position.

The arrangement is therefore such that each increment of carry received from a lower order will be backed out upon completion of the calculation, unless the increment amounts to an entire position, in which case the high portion of the snail cam 281 standing under the roller 316 prevents such backing out. The result is that when the dipping carriage is raised, each dial is controlled by the snail cam 281 of the next lower order dial so that the proper figure will be squarely lined up to its sight opening.

Only the dial immediately to the right affects the backing up of a dial and the increment of carry in any one dial is not backed out entirely until that in the one immediately to the right is removed. Thus the task of having the last dial distinguish between two values, as 29,998 and 30,001, is obviated. Thus, with 29,998, when the dipping carriage is returned, the 2 dial is not returned until the dials to the right have returned. Then the 2 dial is moved back only 0.9000 of the way and not 0.9998 of the way, the 0.0998 of a turn having been previously backed out.

If a value to be displayed upon the completion of a calculation involves a series of nines as in the figure 29,998 above mentioned, or as always occurs in case an overdraft has been made (that is, when a subtraction has been made with a subtrahend greater than the minuend), the dials which are to display the nines will stand substantially at zero except the extreme dial to the right of this series. As the extreme right dial is brought fully into its "nine" position by the removal of any increment of carry in the manner previously described, the roller is allowed to follow down to the lowest radius of the cam, thus backing the next higher order dial by very nearly a full step. If the higher order dials were already standing substantially at zeros, the backing up operation would thus bring each in turn to a nine which would allow the roller in that order to drop from the high portion of the cam down to the low radius of that cam. This dropping of the roller would in turn back the next higher order up one step which, if the dial were standing substantially at zero, would result in a repetition of the process. Thus, if with a series of dials standing at zero, the extreme right dial in the line is backed up to a nine registration, a carry wave results in which each of the dials successively moves from "zero" to "nine," each dial commencing its backward movement only when the next dial to the right has allowed the roller to drop over the corner of the high point of the cam and proceed to drop far enough to bring the order in question into operation.

The assembly of the sun gear 280, snail cam 281, and numeral bearing dial 279 in proper timed relationship has been previously described. Similarly, the assembly of gears 288, sun gear 299, plate 292, gear 273, spider 300, and ring gear 301 on sleeve 293 to provide another sub-assembly, with the apertured ear 295 opposite the space between two adjacent teeth on gear 273, has also been described, as has the assembly of sleeve 294 and arm member 304. In assembling the accumulator, these units, shown in perspective in Figure 9, are assembled on shaft 270 as it is passed through the plates 266, each one of the unit assemblies being positioned on the shaft as it is advanced. The previously described unit sub-assemblies are quickly and easily brought into the proper timed relationship with each other by, simultaneously with the positioning of the successive units on the shaft 270, passing a timing rod 323 through the aperture provided in each unit. Thus, the timing rod is first passed through the aperture 339 in the snail cam 281, as appears in Figure 10. The unit sub-assembly of the planetary gears and gear 293, and ring gear 301, is then placed on the shaft 270. The planetary gears are then rotated about shaft 270 until the apertured ear 295 in plate 292 will pass the timing rod as well as through an aperture in one of the ears 303 on the spider 300. Plate 304 is then revolved about the shaft 270 until the timing rod can pass through the apertured arm 305. When the rod has been passed through the several apertures in the several sub-assemblies, the whole will be in the proper timed relationship. In the same manner, successive units can be timed and the carriage thus readily assembled and timed and the rods 323 removed to permit operation of the assembled accumulator.

After selection has been made of the values to be entered into the machine, entry of the values into the accumulator is effected.

As previously described, the accumulator is supported by a series of plates 266 connected by a common bail 269 and constituting a dipping carriage pivotally mounted on shaft 262. After selection, plates 266 are rocked about shaft 262 (Figure 13) to bring gear 271 in each order into contact with the actuator gear 189. This gear 189 in each order is rotated at a certain speed and for a certain distance according to the value selected, as has been described in the above identified applications. Dipping of the carriage also results in the release of gears 271 mounted on shaft 272 from pawls 319, each pawl being carried down into engagement with a shaft 565 (Figure 13), whereby the pawls in orders overlying gear 189 are rocked clockwise about shaft 320 against the tension of springs 318 to release gears 271.

Meshing of an intermediate gear 271 with a gear 189 mounted on a sleeve 169 supported by shaft 170 in each order results, upon rotation of gears 189, in the selected value being entered in the accumulator. To secure dipping of the carriage at the correct cyclic time, means operated by the setting clutch and described in detail in the aforesaid applications are provided for dipping the carriage and thus permitting transfer of the value selected.

Figures 14, 16:
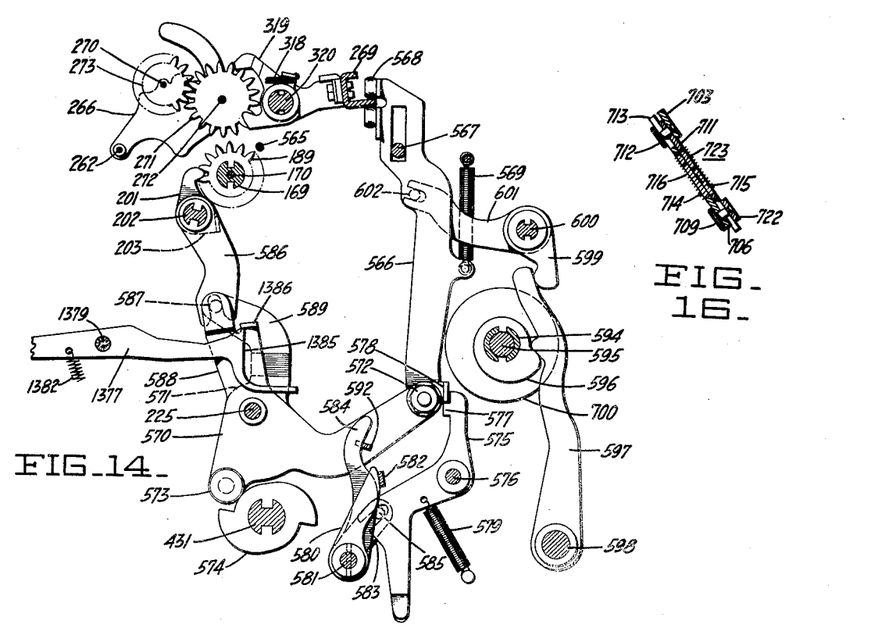
Figure 14 is a side elevation, partly in section, illustrating the carriage dipping mechanism and certain controls therefor.
Figure 16 is a section taken on the line 16—16 of Figure 15 illustrating the construction of the spring link.

The means for dipping the carriage, from that position in which it appears in Figure 14, to bring gears 271 into mesh with gears 189 and then elevate the carriage at completion of the calculation, comprise two vertical sliding links 566 (Figure 14) slidable over pins 567 on opposite sides of the machine. Each link is provided with rollers 568 engaging bail 269, the links being biased upwardly by a spring 569. Links 566 are hinged to cam levers 570 and 571 mounted on shaft 225, by eccentric studs 572 so as to provide for adjustment of the mesh between gears 271 and 189. The cam levers carry rollers 573 in engagement with cams 574 on shaft 431 so that the links 566 are positively pulled down by the setting clutch rotation.

Means are provided for latching the carriage in raised position when the accumulator is not in operation and during shifting or clearing operations, and for latching the carriage in its lower position during engagement of gears 271 and 189. This means includes a latch lever 575 in the form of a bell crank pivoted at 576 and having a nose 577 formed at the upper end thereof to engage the lower edge of lateral extensions 578 on cam levers 570 and 571. The latch levers are urged to engage the extensions 578 by spring 579, and are normally effective to maintain the carriage in its raised position.

To disengage the latch levers 575 and permit lowering of the carriage upon beginning of a setting clutch operation, as well as to latch the carriage in its lower position, means are provided to move levers 575 and so rock their noses 577 out of engagement with the lower faces of extensions 578, and back into engagement with the upper faces thereof. A lever 580 is secured to shaft 581 (see Figure 14) in position to be engaged by an extension 582 actuated at the beginning of the setting clutch operation as described in application Serial No. 702,949 above referred to. Arms 583, also secured to shaft 581, are connected to levers 575 by pivotal connections 585 so that when they are thus rocked, the links 566 are not held by noses 577, and cams 574 may then lower the carriage. As the carriage reaches its down position, springs 579 pull the latch levers counter-clockwise to reengage extensions 578.

Rocking of shaft 202 to release pawls 201 from gears 189 is accomplished in time with the dipping of the carriage so that release of the gears 189 is properly coordinated with the lowering of the carriage and the meshing of gears 271 with gears 189. Keyed to the shaft 202 on each side of the machine are depending levers 586 slotted to receive pins 587. The rocking cam lever 570 at the right hand side of the machine, looking from the front, includes an integral extension 588 which carries one pin 587 while, at the left hand side of the machine the lever 571 has an extension 589 carrying a similar pin 587. As appears in Figure 14, the members 588 and 589 are of different shapes because of the necessity of getting in and around certain other operating parts which might otherwise interfere.

When the setting clutch rotates the cam 574 to rock the cam levers 570 and 571, the pawls 201 are thus released, except in those orders in which a zero has been set up, and pawl tails 203 are blocked, as has been previously explained in application Serial No. 702,949 above referred to.

Movement of latch lever 575 is effected under the control of the described mechanism, and means are provided for releasing the latch lever 575 at the end of main clutch operation. These include (Figure 14) lever 584 secured to shaft 581, as are levers 580 and 583, so that the three move in unison. Hung on a shaft 590 (Figure 13) is a lever 591, one end of which is provided with an extension 592 lying against lever 584 and having a portion in engagement with a cam 593 keyed to a sleeve 594 rotatably mounted on shaft 595. This sleeve is driven by a separate clutch 700 operated only as an incident to the termination of operations, and known as the "restore clutch."

Figure 15:
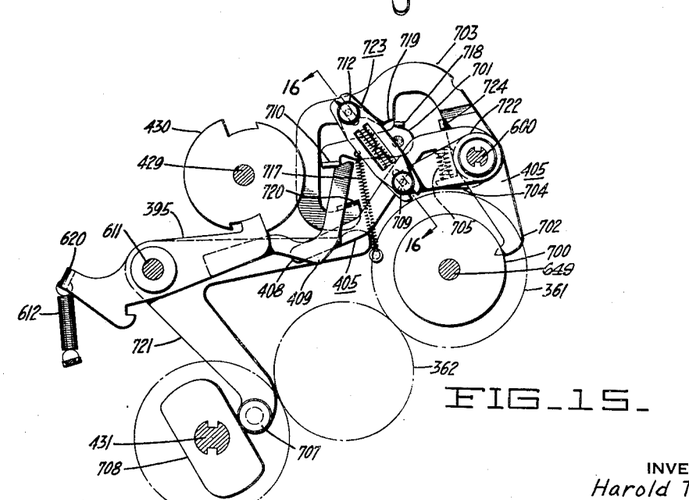
Figure 15 is a detail view showing the restore clutch and mechanism for controlling this clutch.

When the main clutch dog 395 (Figure 15) is moved to stop and release main clutch 430, as will be described hereinafter, the restore clutch 700 starts operation and cam 593 is rotated. This rocks lever 591 clockwise to move lever 584 and so rocks levers 575 to release the latched-down carriage through the rocking of the levers 575 by levers 583 and pivotal connections 585.

The sleeve 594 carries another cam 596 (Figure 14) which is employed to prevent the carriage from rising too rapidly. Lever 597, hinged on shaft 598, bears against this cam and against a lever 599 keyed to shaft 600. Lever 601 is also keyed to this shaft and is joined by a pin and slot connection 602 to one of the links 566 so that the rate of rise of the carriage under the pull of springs 569 is no greater than that permitted by cam 596.

The counter-clockwise rocking movement of levers 570 and 571 also controls automatic carriage shifting through engagement of lug 1386 with the end 1385 of lever 1377 pivoted on stud 1379 and maintained in position for such engagement by spring 1382, but this mechanism forms no part of the invention claimed herein and therefore will not be described in detail.

The restore clutch 700 which is employed to effect the release of the carriage latch member 566 and to control the rate of the return of the carriage from its dipped position, is jointly controlled by the dipping carriage and by the main clutch dog, in such a way that whenever the carriage is in its lower position and the main clutch dog 395 is seated home in the notch of the main clutch, the restore clutch will open and complete one cycle of operation.

The clutch particularly employed is similar to that disclosed in the patent to Friden, Number 1,643,710. This clutch, which is mounted upon and driven by shaft 649 (Figure 15 through gear train 361, 362), is directly controlled by an extending nose 702 on a clutch release dog in the form of a bell crank 405 which is freely supported on a shaft 600. For controlling the clutch release dog, an M-shaped member 703 is provided which has one foot rotatably mounted on the shaft 600, and a lug 704 thereon, supporting a spring 705 compressed between itself and the left arm 408 of bell crank 405.

An arm 722 keyed to the shaft 600, and thus rocked by dipping movement of the carriage, is resiliently connected to the M-shaped member 703 by a link unit 723 shown in detail in Figure 16. As appears in this figure, the link structure includes a first link member 706 secured by a pin 709 to the arm 722, and another link 711 secured by pin 712 to the M-shaped member 703, the other ends of each link being slotted as at 713 to receive either the pin 709 or 712. Each link has a cut out portion into which two tenons 714 and 715 extend, the respective tenons being of different lengths so that a column support is provided for the spring 716, slipped over the adjacent tenons in each link, so that when the unit is pulled apart, the spring is compressed. Likewise, when the overall length of the unit is reduced, the spring is also compressed so that the spring tends to maintain the link at a given and constant length while being continuously supported by the overlapping tenons.

As the setting clutch rotates, the main clutch dog 395 (Figure 15) is withdrawn from contact with the main clutch 430 on shaft 429, tensioning spring 612 secured to lug 670 on said dog, and an extension 409 on said dog is withdrawn from beneath a latch member 701 pivoted on a frame plate, thus permitting said latch member to be rocked counter-clockwise by its spring 717 tensioned between one end thereof and the frame. A lateral extension 718 on said latch member is thereby brought beneath the face 719 of the M-shaped member 703 to prevent the lowering of the carriage, which ensues immediately, from rocking the restore clutch dog 405. The foot of M-member 703 is provided with a shelf 720 overlying one end of a bell crank 721 which is rotatably supported on shaft 611. The other end of bell crank 721 is provided with a roller 707 lying against the periphery of a cam 708 on the setting clutch shaft 431. On rotation of the setting clutch, the bell crank 721 is rocked and shelf 720 is raised by the end of the bell crank to rock the M-shaped member 703 slightly clockwise about the shaft 600. This raising of the member 703 not only insures that the lug 718 of the latch member 701 will engage under the face 719 properly when the main clutch is engaged, but provides for the situation, occurring in certain division operations, when operation of the setting clutch does not cause engagement of the main clutch. In this situation the latch member 701 is not permitted to rock and the cam 708 serves to delay operation of the restore clutch until near the end of the setting clutch cycle.

As the setting clutch continues to rotate, the dipping carriage is lowered and shaft 600 is rocked counter-clockwise by arms 601 (see also Figure 14) keyed thereto and connected with the carriage lowering links 566. Arm 722 (Figure 15) keyed to the shaft 600, is thus lowered, and since the M-shaped member 703 is held by the latch member 701, the link unit 723 is lengthened and its spring 716 compressed.

The parts remain so positioned until the main clutch dog 395 is permitted to reseat in the notches of the clutch discs, whereupon the extension 409 strikes the lateral projection 710 of the latch member 701, rocking it clockwise and removing its lug 718 from under the face 719 of member 703. Spring 716 is then permitted to expand, shortening the link unit 723 and rocking the member 703 counter-clockwise to correspondingly move the restore clutch dog 405 through its contact with lug 724 on said member 703.

Operation of the restore clutch thus initiated, causes the dipping carriage to rise, as previously described, rocking arm 722 clockwise by virtue of its connection therewith. Movement of the arm 722 is, in this operation, transmitted directly through the link unit 723 to rock member 703 clockwise, and to compress spring 716 until the nose 702 of the restore clutch dog 405 can reenter the aperture of the housing to disconnect the clutch, whereupon the mechanisms are brought to rest in the position shown in Figure 15.

I claim:

1. In an accumulator comprising registering wheels connected by entrained gearing including rockable spring-pressed gear carriers, and cams carried by said registering wheels, the combination of free arms cooperating with said cams and connected with said gear carriers to limit movement of said gear carriers in one direction, and positively acting means for rocking said gear carriers in the opposite direction to suspend cooperative relationship between said carriers and said cams.

2. In a calculating machine provided with accumulator mechanism having entrained carry mechanism in association with a compensating cam and cam follower; the combination of reversible actuating mechanism for said accumulator mechanism, means for connecting and disconnecting said accumulator mechanism with said actuator mechanism, and means operable by said last named means for suspending cooperative relationship between said compensating cam and its follower.

3. In a calculating machine having numeral wheels, crawl tens transfer devices between said wheels, and actuating means for said wheels; the combination with means for aligning said wheels to eliminate partial transfers, of means operable in timed relationship with said actuating means to disable the aligning means during actuation of said wheels by said actuating mechanism.

4. In a calculating machine having numeral wheels, crawl tens transfer devices between said wheels, and actuating means for said wheels; the combination with spring operated devices individual to the numeral wheels and adapted to compensate for partial tens transfers and thereby bring said wheels to aligned reading position, of means operable in timed relationship with said actuating means to restrain the compensating devices, and means operable as the actuating means is brought to rest to release the restraining means.

5. In a calculating machine having numeral wheels, crawl tens transfer devices between said wheels, and cyclic actuating means for said wheels; the combination with means for aligning said wheels to eliminate partial transfers, of a cam driven in timed relationship with said actuating means, a lever operable by said cam to adjust the aligning means to inoperative position, a latch adapted to hold said lever in operated position, and means operable as the actuating means is brought to rest in full cycle position to trip the latch.

6. In a motor driven calculating machine having actuators, a main clutch for controlling operation of said actuators by said motor, and a register carriage carrying registering mechanism adapted to be engaged with said actuators; the combination of setting clutch mechanism for causing engagement of said registering mechanism with said actuators, means including restore clutch mechanism for causing disengegement of said registering mechanism and said actuators, means conditioned by engagement of said registering mechanism with said actuators to initiate operation of said means for causing disengagement of said registering mechanism and said actuators, means for restraining said disengagement causing means after the same is so conditioned to prevent the initiation of operation thereof, and means jointly controlled by said setting clutch mechanism and said main clutch for releasing said restraining means to permit the initiation of operation of said disengagement causing means after the same has been conditioned as hereinabove set forth.

7. An accumulator comprising numeral wheels connected by entrained gearing and mechanism including cams operable by said numeral wheels and followers therefor, for controlling the alignment of said numeral wheels for reading; characterized by the fact that said cams are mounted for limited movement with respect to said numeral wheels, and movable with respect thereto by means comprising said followers.

8. An accumulator comprising numeral wheels connected by entrained gearing and mechanism including cams operable by said numeral wheels and followers therefor, for controlling the alignment of said numeral wheels for reading; characterized by the fact that said cams are mounted for limited movement with respect to said numeral wheels, spring urged into a predetermined position with respect thereto, and movable with respect thereto by means comprising said followers.

9. An accumulator comprising numeral wheels connected by entrained gearing and mechanism including cams operable by said numeral wheels and followers therefor, for controlling the alignment of said numeral wheels for reading; and means for moving said followers out of cooperative relationship with said cams to permit rotation of said numeral wheels in either direction; characterized by the fact that said cams are mounted for limited movement with respect to said numeral wheels, and movable with respect thereto by means comprising said followers so as to permit movement of said cams with reference to said numeral wheels during movement of said followers out of cooperative relationship with said cams.

10. An accumulator comprising numeral wheels connected by entrained gearing and mechanism including cams operable by said numeral wheels and followers therefor, for controlling the alignment of said numeral wheels for reading; and means for moving said followers out of cooperative relationship with said cams to permit rotation of said numeral wheels in either direction; characterized by the fact that said cams are mounted for limited movement with respect to said numeral wheels, spring urged into a predetermined position with respect thereto, and movable with respect thereto by means comprising said followers so as to permit movement of said cams with reference to said numeral wheels during movement of said followers out of cooperative relationship with said cams.

HAROLD T. AVERY.